United States Patent [19]

Chatterjea

[11] Patent Number: 4,484,726
[45] Date of Patent: Nov. 27, 1984

[54] PULSATION LIMITER FOR MANUALLY ACTUATED HYDRAULIC VALVE

[75] Inventor: Probir K. Chatterjea, Mount Prospect, Ill.

[73] Assignee: Dresser Industries, Inc., Dallas, Tex.

[21] Appl. No.: 404,190

[22] Filed: Aug. 2, 1982

[51] Int. Cl.$^3$ ............................................ F16K 31/122
[52] U.S. Cl. ........................................ 251/51; 251/55
[58] Field of Search ...................... 251/48, 50, 51, 55

[56] References Cited

U.S. PATENT DOCUMENTS

| | | | |
|---|---|---|---|
| 2,500,555 | 3/1950 | Majneri | 251/50 |
| 2,679,263 | 5/1954 | Kiser et al. | 251/51 |
| 3,316,031 | 4/1967 | Henry-Biabaud | 251/51 |
| 3,450,381 | 6/1969 | Guin | 251/51 |
| 3,631,887 | 1/1972 | Fellbach et al. | 251/48 |
| 4,287,813 | 9/1981 | Chatterjea et al. | 91/434 |
| 4,340,234 | 7/1982 | Ise | 251/51 |

Primary Examiner—Martin P. Schwadron
Assistant Examiner—John A. Rivell
Attorney, Agent, or Firm—Barry E. Deutsch

[57] ABSTRACT

A pulsation limiter for a manually actuated hydraulic valve includes a spring biased, motion retarding plunger in an auxiliary bore within the valve housing and having a helical groove disposed on its periphery abuts against the input sleeve during the initial portion of its travel to actuate the brakes, a check valve in the plunger allowing filling of the expanding cavity in the auxiliary bore behind the motion retarding plunger. When the brake pedal is released partially or completely, the input sleeve moves until it abuts against the plunger. Thereafter, the pressure buildup in the auxiliary bore cavity closes the check valve in the plunger and the input sleeve can only move relatively slowly back to its initial position as the fluid trapped in the auxiliary bore cavity exits through the helical groove.

5 Claims, 3 Drawing Figures

PULSATION LIMITER FOR MANUALLY ACTUATED HYDRAULIC VALVE

This invention relates to manually actuated hydraulic valves of the type used, for example, as a booster valve for a hydraulic brake and more particularly, to a pulsation limiter incorporated in such a valve which reduces or eliminates the transient effects on the valve system as a whole caused by partial retraction, especially a sudden retraction, of the external actuator.

In U.S. Pat. No. 4,287,813, there is described a two stage concentric hydraulic brake booster system which includes a brake pedal, a return spring therefor, and a link connecting the pedal to an input sleeve in the booster valve housing. Telescoped within the input sleeve is a metering spool which upon external actuation of the input sleeve delivers hydraulic pressure to an expansible chamber having a moveable power piston which in turn engages a conventional dual master brake cylinder. Although for the most part, this brake booster has worked quite well, it was discovered that undamped and annoying pulsation of the pedal-input sleeve-metering spool-spring system can occur when the brake pedal is rapidly but not completely retracted. Substantial pulsating pressure transients occur in the booster valve and appear to result from both the operator and the hydraulic components simultaneously reacting to rapid changes in braking pressure caused by a partial retraction of the brake pedal and input sleeve thus overcompensating for undershoots in the pressure.

SUMMARY OF THE INVENTION

Accordingly, it is a primary object of the invention described and claimed herein to provide a manually actuated hydraulic valve system with a means of reducing or eliminating such externally induced pressure pulsations.

A more specific object of the invention is to provide a hydraulic brake booster valve system with a means of eliminating or reducing pressure transients in said valve which may occur as a result of partial release of the applied braking pressure.

A still more specific object of the invention is to provide a motion retarder in said booster valve assembly which only permits a relatively slow return of the input sleeve when the brake pedal is retracted.

The above and other objects of the invention as may become apparent herein are specifically met in a braking system having a valve housing, an input sleeve in the housing connected to an operator actuated, spring returned brake pedal, and a metering spool within the input sleeve wherein actuation of the input sleeve causes vehicle supplied hydraulic pressure to actuate a power piston disposed to engage a master brake cylinder. A spring biased, motion retarding plunger in an auxiliary bore within the valve housing and having a helical groove disposed on its periphery abuts against the input sleeve during the initial portion of its travel to actuate the brakes, a check valve in the plunger allowing filling of the expanding cavity in the auxiliary bore behind the motion retarding plunger. When the brake pedal is released partially or completely, the input sleeve moves until it abuts against the plunger. Thereafter, the pressure buildup in the auxiliary bore cavity closes the check valve in the plunger and the input sleeve can only move relatively slowly back to its initial position as the fluid trapped in the auxiliary bore cavity exits through the helical groove. In addition to the advantages recited above, the helical groove on the plunger allows very small quantities of fluid to be used yet provides adequate increases in the return time of the input sleeve by increasing the resisted path of travel of the fluid. The net effect is to increase the return time of the input sleeve by a factor of 10 allowing sufficient time for the valve components to gradually react to changes in their position.

DESCRIPTION OF THE DRAWINGS

Other objects and advantages of the invention will become more apparent upon reading the following detailed description of the invention and upon reference to the drawings, in which:

FIG. 3 is a still larger view of only the auxiliary bore and plunger assembly incorporated within the brake system of FIGS. 1 and 2.

DETAILED DESCRIPTION OF THE INVENTION

Figure 1:
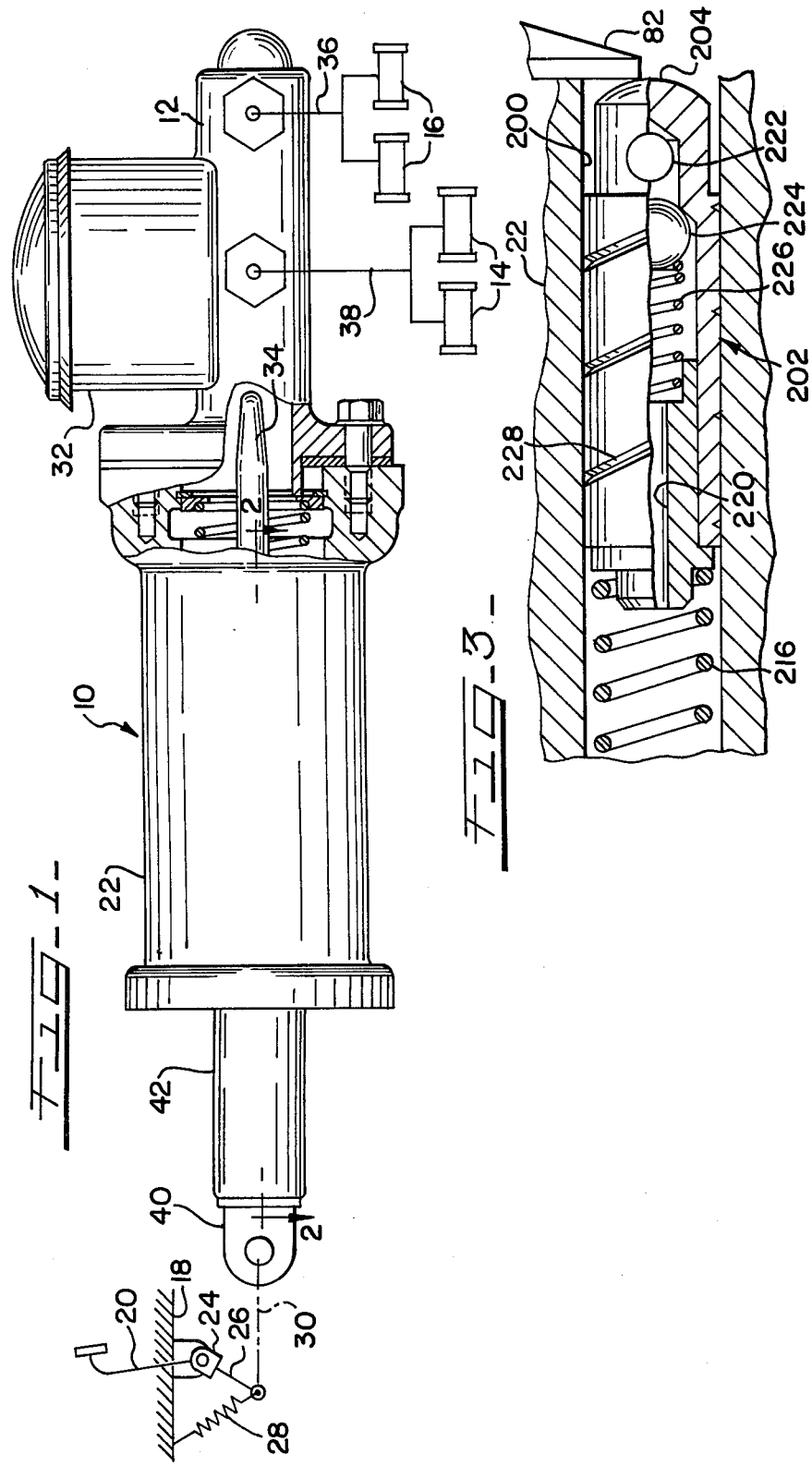
FIG. 1 is a partly schematic, partly broken away, side elevation of a braking system incorporating the present invention.

Turning now to FIG. 1 of the drawings, a hydraulic booster brake system 10 is shown including a conventional dual braking cylinder 12 connected separately to the front wheel brake cylinders 14 and to the rear wheel brake cylinders 16 of a vehicle partially shown at 18 such as a wheel loader. The dual cylinder 12 responds directly to an operator input pedal 20 through the intermediary of a two stage concentric brake booster 22 for supplying the wheel cylinders 14 and 16 with hydraulic brake fluid under pressure to establish brake drag as desired on the vehicle wheels (not shown) or to cause them to stop.

In more specific detail, in the foot brake mechanism, establishing the master brake setting and master boost pressure setting, the pedal 20 forms one of the arms of a bellcrank 24 secured on a fixed pivot of the operator's platform of the vehicle 18. A depending bell crank arm 26 is controlled at its outer end by an anchored brake return spring 28 and controls a rearwardly extending push link 30. The dual braking cylinder 12 carries the usual capped fluid reservoir 32 on top and is activated at its inner end by a plunger or a thrust probe 34. The probe 34 projects into the cylinder 12 to thrust against standard tandem connected, hydraulic master cylinder pistons (not shown) the leading one of which supplies one separate hydraulic line 36 for the rear wheel cylinders 16 and the trailing one of which supplies another separate hydraulic brake line 38 supplying the cylinders 14 on the vehicle front wheels (not shown). All fluid in the circuit from the reservoir 32 to the wheel cylinders is in a self-contained independent hydraulic brake system.

The push link 30 operates the booster valve 22 ordinarily under motion amplification and hydraulic force amplification so as to cause the braking operation through the power piston connected probe 34. More particularly, a clevis 40 to which the link 30 is pivotally connected is threaded solidly into and is carried by an input signal spool or sleeve 42 disposed in the booster valve bore 122 and mechanically moves the input sleeve into various positions within the booster valve 22. The booster valve is supplied with hydraulic fluid from a pressurized circuit separate from the independent system of the brake cylinder 12.

Figure 2:
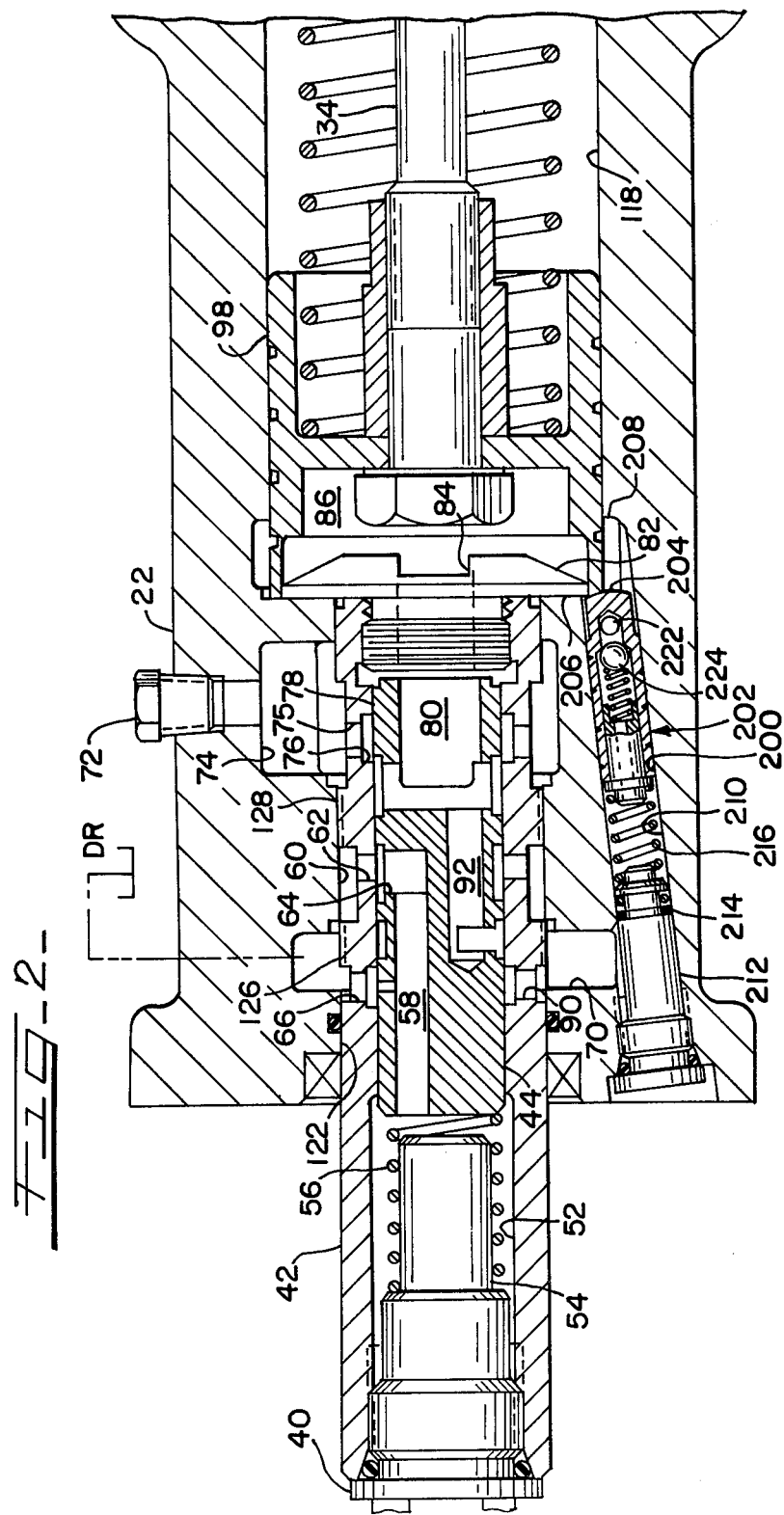
FIG. 2 is a enlarged sectional view of the booster valve assembly of the braking system of FIG. 1 taken along the line 2—2 thereof.

Referring now to FIG. 2, at its innermost end, the input sleeve 42 is provided with a flanged spool stop 82 threaded into the end of the input sleeve 42 to abut against the end of that portion of the booster valve 22 containing the main bore 122. The spool stop flange operates in the power piston cylinder 86 in the bore 118 and is provided with a hollow center portion 84 to permit the passage of fluid longitudinally therethrough. Intermediate its ends and within the booster cylinder bore 122, the input sleeve 42 is provided with a plurality of radially extending ports for communicating with the interior portion thereof including an input pressure port 75 between an interior annulus 76 and an input pressure annulus 74 in the booster valve 22 which is continuously exposed to a source of high pressure hydraulic fluid as through inlet 72. The input sleeve 42 is further provided with radial ports 66 which communicate with a drain annulus 70 in the valve housing 22 which is appropriately connected to a drain Dr such as a vehicle reservoir. A pressure sensing annulus 60 is disposed on the input sleeve 42 between the input pressure port 75 and the drain port 66 and communicates through ports 62 to the interior portion thereof. Further disposed on the exterior of the input sleeve 42 between the input port 75 and the sensing annulus 60 and also between the sensing annulus 60 and the drain port 66 are helical grooves as at 126, 128 (shown in broken lines) together forming a hydraulic potentiometer wherein the pressure in the sensing annulus 60 is dependent upon the relative exposures of the helical grooved portions 126 and 128 to their respective annuluses 70 and 74.

Concentrically disposed within the input sleeve 42 is a metering spool 44 having one end in sensing chamber 52 stopped by the internal end 54 of the clevis 40 threaded into the outer end of the input sleeve 42. The other end of the metering spool 44 is stopped by the threaded end of the flanged stop 82. A weak spring 56 in the sensing chamber 52 biases the spool 42 toward the stop 82. The metering spool 44 is further provided at its inner end with an internal chamber 80 which communicates through a radial port and annulus with the internal input annulus 76 of the input sleeve 42, the pressure being throttled down from the input pressure in 74 by the action of the outer diameter of the metering spool 44 with the left edge of the internal annulus groove 76 in the input sleeve. The pressure in the internal chamber 80 of the metering spool 44 is communicated directly through the passage 84 to the variable volume power piston cylinder chamber 86 which contains the power piston 98 to which the thrust probe 34, which actuates the master cylinder a is securely bolted. An internal axially extending passage 92 extends from the chamber 80 within the metering spool 44 to a radial port 90 therein positioned such that when the land 78 of the metering spool closes off the internal annulus 76 in input sleeve 42, the radial port 90 establishes communication of the internal chamber 80 with the drain annulus 70 through the radial port 66 in the input sleeve 42. The metering spool 44 further has an axially extending passage 58 which extends from a radial port 64 which generally aligns with the sensing port 62 in the input sleeve 42 to communicate the pressure in the sensing annulus 60 to the sensing chamber 52 in the left or outer end of the input sleeve 42.

It will be appreciated that all of the above structure is recited in considerably greater detail with considerably greater functional explanation in U.S. Pat. No. 4,287,813, which patent is specifically incorporated by reference herein. However, for the purpose of the present invention the above would appear to be sufficiently explanatory of the structure, especially when considered with the following functional explanation of the booster valve 22.

When the brake pedal 20 is in the rest position, retained therein by the return spring 28, the input sleeve 42 is in its fully withdrawn position as shown in the drawings. In this position, the sensing annulus 60 is in hydraulic communication with the drain annulus 70 and thus the fluid pressure in the signal pressure chamber 52 within the input sleeve 42 is zero. Accordingly, the only force acting on the metering spool 44 is that produced by the weak spring 56 which causes the metering spool to just crack open the input annulus 76 and the input sleeve to produce about 5 psi pressure in the internal chamber 80 and power piston chamber 86. This pressure is insufficient to overcome the return spring on the power piston as well as those in the master cylinders but maintains the metering spool in a position for ready response upon actuation of the brake pedal.

When the brake pedal is depressed, the input sleeve 42 moves inwardly increasing the amount of the helical groove 126 thereon which is covered by the bore 122 of the valve while decreasing the coverage thereby of the helical groove 128. This increases the pressure in the sensing annulus 60, which pressure is communicated through the radial port 62 and 64 and through the axial passage 58 in the spool 44 to the sensing chamber 52. This signal pushes the metering spool towards the right opening up the input annulus 76 and increasing the pressure in the internal chamber 80 and also in the power piston chamber 86 causing the power piston 98 to move towards the right. It is noted that, except for transient variations, the pressure in the chamber 80 is always substantially equal to the pressure in the sensing chamber 52 and sensing annulus 60 which in turn is directly proportional to the axial position of the input sleeve helical grooves 126,128 relative to the bore of the valve housing 22. The pressure in the power piston chamber 86 acts against the flanged stop 82 and the input sleeve 42 and is thereby transmitted back to the operator through the pedal 20 and linkage so that the operator will feel the increasing braking pressure.

If the brake pedal is completely released, the sensing annulus 60 becomes connected with the drain annulus 70 and the pressure in the sensing chamber goes to zero. At the same time, the internal chamber 80 and power piston chamber 86 also become connected to the drain annulus 70 through the axial passage 92 and port 90. However, when the brake pedal is only partly retracted, for example, to reduce the pressure in the power piston chamber 86 from 300 psi to 100 psi, and especially if this is done rapidly, the pressure in the power piston chamber 86 may undershoot momentarily, for example, to 50 psi, as the metering spool reacts to the change in the position of the input sleeve. Although the metering spool will react very quickly to this undershoot and correct it, the operator's foot, which feels the pressure in chamber 86 through the flanged stop 82 and input sleeve 42, also tries, perhaps unconsciously, to correct for the undershoot by moving the input sleeve in a little bit. This overcorrecting of the undershoot causes an excitation impulse of the metering spool, and starts pressure pulsations, probably at a frequency dictated by the various springs. An operator with an educated foot could make this pulsation last 15 to 20 seconds, although it would normally last only a few seconds. In any case, the pulsations are felt by the operator through his foot and are thus undesirable.

In accordance with the present invention, means are provided to cope with this. An auxiliary bore 200 is provided in the housing 22 and intersects the power piston bore 118 just beneath the flanged edge of the spool stop 82. Disposed in the auxiliary bore 200 is a motion retarding plunger 202 slidingly fit therein in relatively close tolerance. The plunger 202 includes a rounded nose portion 204 which contacts, at least during braking, an abutting surface 206 on the axially outward face of the flanged stop 82. During braking, the power piston 98 is immediately moved away from its position shown in the drawing so that true abutment of the plunger 202 with the flanged spool stop 82 occurs. The auxiliary bore 200 is further provided with a stop shoulder 208 at its inner end to limit the travel of the plunger 200. The plunger 202 further encloses a cavity 210 in the bore 200 which is enclosed on its outer end by a plug and spring retainer 212 threaded thereinto. An O-ring 214 seals the bore 200 at the plug and leakage past the seal may be drained into the drain annulus 70. A spring 216 is disposed between the plug 212 and the plunger 202 in order to cause the plunger to follow the movement of the flanged spool stop 82 until the plunger hits the stop 208 in the bore 200.

Looking with greater detail at the plunger 202 and referring to FIG. 3, it will be seen that the plunger includes an internal passage 220 extending axially from the end of the plunger adjacent the cavity 210 and communicating therewith, to the nose end 204 of the plunger whereat it intersects radial ports 222 which communicate with the auxiliary bore 200 and the power piston chamber 86. Intermediate the ends of the axial passage 220, a check valve 224, biased by a spring 226, permits flow toward the cavity end 210 of the plunger upon overcoming the spring 226 and prohibits flow from the cavity end to the nose end. The plunger 202 is further provided with a helical groove 228 disposed on its outer cylindrical portion which extends from a first end communicating with the cavity 210 to a second end communicating with the portion of the bore 200 which is in direct communication with the power piston chamber 86. Typically, the depth of the groove 228 would be 0.5 mm.

In operation, when the input sleeve 42 moves into the valve housing 22 and the flanged spool stop 82 moves therewith, the spring 216 in the auxiliary bore 200 will push the plunger 202 to maintain contact with the abutment surface 206 of the input sleeve stop 82, the power piston 98 having moved away therefrom. As the input spool stop 82 moves further into the chamber 86, the plunger 202 will continue to follow it until it reaches its stop 208 in the auxiliary bore 200. During this movement of the plunger, hydraulic fluid in the power piston expansible chamber 86 and that portion of the auxiliary bore 200 communicating therewith enters the axial bore 220 of the plunger through the radial ports 222 and flows past the check valve 224, overcoming the spring 226, and fills the expanding cavity 210. If the input sleeve 42 moves the flanged spool stop 82 beyond the limit of the travel of the plunger caused by the stop 208, no further filling of the cavity 210 will occur.

Upon retraction of the brake pedal 20 and input sleeve 42 by the operator, the input spool stop 82 will move rapidly towards sleeve 42 until the abutting surface 206 thereon contacts the nose 204 of the plunger 202 which picks up the return load and causes an increase in the pressure in cavity 210. At this point, the check valve 224 will close and, consequently, the fluid in the cavity 210 can only escape therefrom by passing through the helical groove 228 until it reaches the portion of the auxiliary bore 200 communicating with the chamber 86. Because the helical groove is relatively small, the plunger will increase the time for retraction of the input sleeve 42 from the valve housing 22 by a factor of 10 compared to the time without the plunger assembly. While the time for retraction is still relatively short, on the order of 0.2 seconds with the plunger 202, it provides sufficient time for the metering spool 44 to maintain equilibrium between the sensing chamber and power chamber without significant undershooting. Consequently, the operator does not feel any undershoot and there is no overreaction to start the pulsation mode.

It will be appreciated that although discussed in the context of a brake booster valve assembly the motion retarding plunger may be useable in similar applications wherein manually actuated valve spools are abruptly retracted. Additionally, although the plunger has been described in connection with a preferred embodiment thereof other means of filling the cavity behind the plunger or of causing it to follow the flanged stop 82 may be possible such as maintaining an interruptable pressure supply to the cavity 210 as from the input annulus 74.

What is claimed is:
1. A hydraulic valve mechanism comprising:
 a housing having a fluid receiving axial bore and an auxiliary bore intersecting said axial bore;
 a valve sleeve slideably disposed in said axial bore and mechanically connected to an external manual actuation means, said sleeve having a first position unactuated by said manual means and a second axially spaced position in response to actuation by said manual means, said valve sleeve further having an abutment surface confronting said auxiliary bore;
 a plunger having a cylindrical periphery slideably disposed in close clearance in said auxiliary bore, said plunger having a first end disposed to abut said valve sleeve abutment surface and second end defining, with said auxiliary bore, a closed expansible chamber, said plunger cylindrical periphery having a fluid passage thereon establishing restricted fluid communication for fluid flowing from said expansible chamber and that portion of said auxiliary bore communicating with said axial bore;
 biasing means maintaining said plunger in abutting relation with said valve sleeve abutment surface during at least a portion of the travel of said valve sleeve from said first position to said second position; and
 a conduit disposed to fill said auxiliary bore expansible chamber with fluid upon movement of said plunger to follow the movement of said valve sleeve from said first position to said second position, said conduit having a check valve disposed to prevent flow from said chamber when said valve sleeve abuts said plunger and moves towards said first position.

2. The invention according to claim 1 and said plunger periphery fluid passage comprising a helical groove disposed thereon.

3. The invention according to claim 2 and said conduit comprising an axial passage in said plunger communicating between said first end and said second end thereof, said check valve being disposed in said passage.

4. The invention in accordance with claim 3 and said biasing means comprising a spring disposed in said expansible chamber and acting against said plunger.

5. The invention in accordance with claim 1 or claim 4 and a stop associated with said auxiliary bore and disposed to limit the travel of said plunger in response to the movement of said valve sleeve to a distance less than the entire range of travel of the valve sleeve.

* * * * *